Patented Dec. 28, 1937

2,103,872

UNITED STATES PATENT OFFICE 2,103,872

HIGH MOLECULAR NITROGENOUS ORGANIC COMPOUNDS CONTAINING CARBOXYLIC GROUPS

Conrad Schoeller and Paul Koerding, Ludwigshafen-on-the-Rhine, Germany, assignors to I. G. Farbenindustrie Aktiengesellschaft, Frankfort-on-the-Main, Germany No Drawing. Application December 8, 1934, Serial No. 756,706. In Germany December 12, 1933

7 Claims. (Cl. 260—112)

The present invention relates to valuable nitrogenous organic products and a process of producing same.

We have found that nitrogenous organic products containing at least 2 amino groups, at least one radicle with a carbon chain with at least 6 carbon atoms, and at least one carboxylic acid group are most valuable assistants for the textile and related industries. The carboxylic salts of such products with metals, ammonia, amines, alkoxyamines and the like are for the purposes of the present invention equivalent to the products containing free carboxylic groups. They are distinguished for example by the following properties: They have a good protective colloid action: they are continuously stable to metal salts in aqueous solutions, especially to calcium, iron and magnesium salts; they have a high dispersing, levelling and dye-penetration power as well as a good wetting and washing power; they may therefore be employed with advantage in the textile, paper and leather industries for dyeing, printing, bleaching, bucking, dressing, fulling, for imparting a dull lustre to silk or artificial silk, for washing and cleansing. They are excellent softening agents for artificial silk and impart thereto a soft, supple touch. They may also be employed in the artificial silk industry as additions to the spinning masses or liquids. Furthermore they are suitable for many purposes in the cosmetic and pharmaceutical industries; they may also be employed as additions to vulcanization accelerators in the rubber industry and as superfatting agents and as protecting colloids for improving the resistance to lime in the soap industry. The products may also be used in flotation processes and as assistants for combating plant pests.

The said agents may be prepared by producing amines containing at least two amino groups at least one of which is non-tertiary (i. e. primary or secondary) and containing at least one radicle with a chain of at least 6 carbon atoms and introducing into the said amines at least one carboxylic group. A suitable method of producing products of the kind defined consists in condensing amines containing two or more primary or secondary amino groups with aromatic, cycloaliphatic, aromatic-aliphatic or preferably with aliphatic compounds with an open or closed chain of at least 6 carbon atoms and in previously, simultaneously or subsequently introducing into the amines or into the condensation products free carboxylic groups or organic radicles containing the same or capable of forming the same.

Amines suitable for building up products of the type defined above are for example: Ethylenediamine, propylenediamine, symmetrical dimethylethylenediamine, diethylenetriamine, triethylenetetramine, ortho-, meta- and para-phenylenediamine, toluylenediamine, benzidine and diamino diphenylamine.

The radicle containing a chain of at least 6 carbon atoms may be an alkyl group directly attached to the nitrogen of the said amines or it may be attached to the nitrogen by way of a CO group (in this case an acyl group is attached to the nitrogen). The said radicles may be hydrocarbon radicles or they may be substituted by hydroxy, amino, nitro, ester or ether group or by halogen, especially chlorine. The said radicles may also be interrupted by —NH—, —N'-alkyl, —O—, —S— or —CO— bridges. The said amino or hydroxy groups may be substituted on their part; for example such substituted radicles may be introduced into the polyamines in the form of oleic amides of glycocoll or sarcosine or of stearic acid esters of lactic acid.

An advantageous manner of preparing amines containing at least 2 amino groups and at least one radicle with a chain of at least 6 carbon atoms consists in reacting sulphuric acid esters of alcohols of high molecular weight or alcohol halides (alkyl halides) of high molecular weight with polyamines. Alcohols from which derivatives suitable for this purpose may be derived are for example octyl, dodecyl alcohol, myristol, cetyl, octodecyl, oleyl alcohols, montanol, abientinol and octodecandiol; suitable derivatives of the said kind are for example cetyl bromide and the acid sulphuric acid ester of octodecyl alcohol; derivatives of alcohol mixtures obtainable by catalytic hydrogenation of naturally occurring fats and oils may also be used. Another method of preparing the polyamines containing a high molecular radicle consists in causing ethylenediamine (or another polyamine enumerated above together with ethylenediamine) to react with carboxyclic acids of high molecular weight, their halides, anhydrides or esters. As suitable acids may be mentioned: Valeric acid, caproic acid, lauric acid, myristic acid, palmitic acid, stearic acid, oleic acid, abietic montanic acid and naphthenic acids; mixtures of such acids, especially mixtures of acids obtainable by saponification from coconut oil, palm kernel oil, soy bean oil, train oils or tallow or by the oxidation of high molecular paraffinic hydrocarbons may also be mentioned.

The proportion of the compounds of high molecular weight and the amines is preferably so selected that each molecular proportion of amine is reacted with at least one molecular proportion of the aliphatic compounds of high molecular weight (alcohol or its derivatives or acid or its derivatives).

Instead of polyamines containing a high molecular acyl or alkyl radicle such polyamines as contain acyl radicles as well as alkyl radicles with at least 6 carbon atoms may also be employed in the preparation of the products according to the present invention.

Polyamines containing a radicle with a chain of at least 6 carbon atoms obtained in another manner than indicated above are also very suitable; for example suitable polyamines may be obtained by catalytic hydrogenation of nitriles of amino acids containing a radicle of at least 6 carbon atoms; this hydrogenation may be effected for example in an analogous manner as described in the German Patent No. 561,156 and in Example 12 of the French Patent No. 773,367.

Into the products described above a free carboxylic group or groups are introduced. This may be effected during or after the preparation of the said condensation products; carboxylic groups may also be introduced into the components before they are condensed to form the polyamines with the high molecular radicle.

The introduction of the carboxylic group or groups may be effected by introducing a group capable of being readily converted into the carboxylic group and effecting the said conversion. Suitable groups of this kind are the nitrile, carboxylic ester and chlorocarbonic ester groups. Another method consists in introducing radicles of low molecular weight containing the same or capable of producing the same. This may be effected for example by causing them to react with low molecular aliphatic halogen carboxylic acids or polybasic carboxylic acids or their monoesters, as for example monochloracetic acid, monochlorpropionic acid, malonic acid and adipic acid, or the monoesters of these dicarboxylic acids. It is preferable to cause to act on each molecular proportion of the condensation product at least one, and if desired several molecules of the said low molecular acids. The reaction may be carried out with an addition of basic reacting substances. The halogen carboxylic acids, polybasic carboxylic acids and the like combine with the amino groups containing at least one free hydrogen atom in such manner that free carboxylic groups or radicles which are readily converted into carboxylic groups are present in the reaction products.

The carboxylic acid group or groups must not necessarily be directly attached to the amine by a carbon chain, but the said chain may be interrupted by hetero atoms such as nitrogen. The introduction of a carboxylic group linked in such a manner may be effected for example by reacting monochloracetic acid with glycocoll and reacting the compound formed with the polyamine.

The amines containing two or more amino groups to be employed as initial materials may also be first condensed with the low molecular halogen carboxylic acids, polybasic carboxylic acids or the like, the high molecular aliphatic radicles then being introduced into the resulting products. Instead of halogen carboxylic acids and the like, the corresponding acid nitriles, as for example chloracetonitrile, or chlorocarbonic acid esters, as for example chlorocarbonic acid ethyl ester, may be employed. By saponifying the ester or nitrile groups contained in the resulting condensation products, the corresponding compounds, containing carboxylic groups are readily obtained.

Hydroxy alkyl groups or polyglycol ether radicles may be introduced into the products; for example the products may be reacted with ethylene oxide, propylene oxide, polyhydric alcohols, polyglycols or polyglycerines or their halogen compounds. This is of special advantage if the products are only soluble in water with difficulty; in this case they are converted by the said treatment into a water-soluble condition. The reaction with ethylene oxide, propylene oxide or the like may be effected with the amines containing the high molecular radicle or with the products obtainable therefrom by the introduction of carboxylic groups.

In some cases it is advantageous to impart water-solubility to the reaction products by sulphonation in the usual manner, as for example with concentrated sulphuric acid, oleum, or chlorsulphonic acid, if desired in the presence of inert organic solvents.

The products according to the present invention may be used alone or in combination with other wetting, dispersing and levelling agents, as for example with Turkey red oils, sulphuric esters of high molecular aliphatic alcohols, sulphonic fatty acids, mineral oil sulphonates, alkylated aromatic sulphonic acids, condensation products of high molecular fatty acids and hydroxy or amino alkylsulphonic acids or albumen degradation products, reaction products of ethylene oxide and organic compounds which contain hydroxy, carboxylic or amino groups in the molecule and sulphite cellulose waste liquor. They may also be employed together with glue, gelatine, gum arabic, organic solvents, such as cyclohexanol, benzyl alcohol and carbon tetrachloride, inorganic salts, as for example Glauber's salt, alkali metal phosphates, waterglass and borates.

The following examples will further illustrate the nature of this invention but the invention is not restricted to these examples. The parts are by weight.

*Example 1*

340 parts of the amide obtained by heating equimolecular proportions of coconut oil fatty acid and triethylene tetramine are heated to 50° C. Into the molten mass 94 parts of monochloracetic acid are gradually introduced, the temperature rising to about 120° C. The mass is stirred for about half an hour at the said temperature, cooled to about 100° C. and the tough mass mixed with 500 parts of water. The resulting paste is neutralized with caustic soda solution. The product has a good wetting action.

*Example 2*

370 parts of the amides derived from 1 molecular proportion of diethylene triamine and 1 molecular proportion of stearic acid are fused, 94 parts of chloracetic acid being introduced into the fused mass while stirring. The temperature is preferably allowed to rise to 160° C., the whole being stirred at the said temperature for half an hour. The reaction product solidified when cooled; it may be ground and constitutes a pale yellow powder having a slightly acid reaction and being readily soluble in water; it is very suitable for the production of a soft and supple touch in viscose and copper oxide ammonia silk.

Example 3

400 parts of the amide derived from 1 molecular proportion of stearic acid and 1 molecular proportion of triethylene tetramine are stirred in the fused state with 188 parts of chloracetic acid and then heated for a quarter of an hour at 160° C. After cooling to about 100° C., 520 parts of water are stirred in until complete dissolution takes place; the reaction product is then neutralized with caustic soda solution.

The resulting product has a good dispersing power for calcium soaps and prevents the precipitation of calcium salts when alkali is added to hard water. It also has a very high leveling power, especially when dyeing with vat or sulphur dyestuffs. Thus for example very level dyeings are obtained on cotton with Indanthrene Brilliant Violet RR (Schultz, Farbstofftabellen 1931, No. 1,265) or Hydrone Blue R (ibid, No. 1,111) or with sulphur dyestuffs by employing about 0.2 to 0.5 gram of a 40 per cent aqueous paste of the said product per litre of bath.

Instead of the said amide from stearic acid and triethylene tetramine the product obtainable by reacting 2 molecular proportions of ethylene oxide with 1 molecular proportion of the mono amide from stearic acid and triethylene tetramine may be employed as starting component; an excellent leveling and softening agent is obtained which is very stable in acid baths and may therefore be employed with advantage in such baths.

If 30 parts of a 50 per cent paste of the said product (or a similar product derived from oleic acid instead of stearic acid) are mixed with 50 parts of titanium dioxide and 20 parts of water, a preparation is obtained which imparts a dull lustre to colored or non-colored artificial silk which also obtains a very supple touch thereby. By reacting 1 molecular proportion of benzylchloride with 1 molecular proportion of triethylene tetramine, acting on the free base of hydrochloride formed with 1 molecular proportion of coco fatty acid chloride and finally introducing the radicle —CH₂—CO₂H by means of chloracetic acid, a good levelling agent may be obtained.

Another levelling agent suitable for use in acid dyebaths may be prepared by condensing 1 molecular proportion of diaminodiphenylamine with 2 molecular proportions of ethylene oxide and 1 molecular proportion of chloracetic acid.

Example 4

80 parts of N-octodecylpropylenediamine (obtainable by reacting octodecylbromide with propylenediamine) are fused and 35 parts of monochlorpropionic acid are introduced into the molten mass at about 75° C.; the temperature rises to about 140° C. the tough reaction mass formed is allowed to cool to 100° C. and 200 parts of hot water are added. The mass is stirred for a short time and a paste is obtained which is readily soluble in acid and alkaline dye baths; if desired the said paste may be neutralized with alkali. The paste is excellently suitable for example for imparting a soft, supple touch to viscose, copper or acetate artificial silk.

Example 5

30 parts of chloracetic acid are dissolved in a little water and neutralized with caustic soda solution while cooling. At about 20° C., 70 parts of an amine are introduced which is obtained by reacting with propylene diamine, the bromide (or sulphate) of the alcohol mixture obtained by catalytic hydrogenation of palm kernel fat. The temperature is raised by and by to 90° C. while stirring intensely. The condensation is complete after some hours whereupon the paste which contains the salt of the diaminocarboxylic acid formed is adjusted to the concentration desired. The condensation product formed is suitable for example as a levelling agent.

Example 6

1 molecular proportion of symmetrical dimethyl ethylene diamine is introduced into an aqueous solution of 1 molecular proportion of formaldehyde; hydrocyanic acid is led into the solution until it is saturated. Caustic soda is added and the nitrile is saponified to form dimethylethylenediamino acetic acid. The latter is condensed in an alkaline medium with coco fat acid chloride. The product obtained has good wetting properties and is resistant to calcium salts.

What we claim is:—

1. Assistants for the textile and related industries comprising a polyamine the different amino groups of which are separated from one another by a hydrocarbon radicle containing from 2 to 12 carbon atoms, containing attached to at least one of the amino nitrogen atoms an organic radicle containing at least 12 carbon atoms and containing at least one low molecular aliphatic radicle with at least one carboxylic acid group.

2. Assistants for the textile and related industries comprising a polyamine the different amino groups of which are separated from one another by a hydrocarbon radicle containing from 2 to 12 carbon atoms, containing attached to at least one of the amino nitrogen atoms an aliphatic radicle containing at least 12 carbon atoms and containing at least one low molecular aliphatic radicle with at least one carboxylic acid group.

3. Assistants for the textile and related industries comprising a polyamine the different amino groups of which are separated from one another by a lower alkylene radicle, containing attached to at least one of the amino nitrogen atoms an aliphatic radicle containing at least 12 carbon atoms and containing at least one low molecular aliphatic radicle with at least one carboxylic acid group.

4. Assistants for the textile and related industries comprising a polyamine the different amino groups of which are separated from one another by a lower alkylene radicle, containing attached to at least one of the amino nitrogen atoms an alkyl radicle containing at least 12 carbon atoms and containing at least one low molecular aliphatic radicle with at least one carboxylic acid group.

5. Assistants for the textile and related industries comprising a polyamine the different amino groups of which are separated from one another by a lower alkylene radicle, containing attached to at least one of the amino nitrogen atoms an aliphatic acyl radicle containing at least 12 carbon atoms and containing at least one low molecular aliphatic radicle with at least one carboxylic acid group.

6. Assistants for the textile and related industries comprising a diamine, the amino groups of which are separated from one another by an alkylene radicle with from 2 to 3 carbon atoms, containing attached to at least one of the amino nitrogen atoms an alkyl radicle containing at least 12 carbon atoms and containing at least one low molecular aliphatic radicle with at least one carboxylic acid group.

7. Assistants for the textile and related industries comprising a diamine, the amino groups of which are separated from one another by an alkylene radicle with from 2 to 3 carbon atoms, containing attached to at least one of the amino nitrogen atoms an aliphatic acyl radicle containing at least 12 carbon atoms and containing at least one low molecular aliphatic radicle with at least one carboxylic acid group.

CONRAD SCHOELLER.
PAUL KOERDING.